(12) United States Patent
Chhabra et al.

(10) Patent No.: US 9,973,895 B2
(45) Date of Patent: May 15, 2018

(54) WIRELESS LOGIN WITH SECURE PROXIMITY DETECTION

(71) Applicant: Apple Inc., Cupertino, CA (US)

(72) Inventors: Kapil Chhabra, Cupertino, CA (US); Welly Kasten, San Jose, CA (US); Artiom Shamis, San Jose, CA (US); Chaitanya Mannemala, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/619,116

(22) Filed: Jun. 9, 2017

(65) Prior Publication Data

US 2017/0359689 A1    Dec. 14, 2017

Related U.S. Application Data

(60) Provisional application No. 62/348,711, filed on Jun. 10, 2016.

(51) Int. Cl.
| | |
|---|---|
| *H04W 12/06* | (2009.01) |
| *H04W 84/12* | (2009.01) |
| *H04W 4/02* | (2018.01) |
| *H04W 4/00* | (2018.01) |
| *H04W 8/00* | (2009.01) |

(52) U.S. Cl.
CPC ........... *H04W 4/023* (2013.01); *H04W 4/008* (2013.01); *H04W 8/005* (2013.01); *H04W 12/06* (2013.01); *H04W 84/12* (2013.01)

(58) Field of Classification Search
CPC ..... H04W 12/06; H04W 4/008; H04W 4/023; H04W 84/12; H04W 8/005
USPC .......................................................... 455/411
See application file for complete search history.

(56) References Cited

U.S. PATENT DOCUMENTS

| | | | |
|---|---|---|---|
| 8,396,452 B1 * | 3/2013 | Matsuoka | G06F 21/35 455/410 |
| 2005/0105734 A1 * | 5/2005 | Buer | G07C 9/00007 380/270 |
| 2007/0277230 A1 * | 11/2007 | Hawkins | H04L 63/08 726/4 |
| 2011/0215921 A1 * | 9/2011 | Ben Ayed | G08B 1/08 340/539.11 |

(Continued)

*Primary Examiner* — Nathan Taylor
(74) *Attorney, Agent, or Firm* — Dickinson Wright RLLP (57) ABSTRACT

After detecting an access-intent operation, an electronic device establishes a connection with a second electronic device using a communication protocol. The electronic devices exchange identifiers, and the second electronic device provides information specifying a preferred channel to use with a second communication protocol. Based at least in part on the preferred channel of the second electronic device and on communication contexts of the electronic devices, the electronic device selects a channel and transmits to the second electronic device information specifying the selected channel. The electronic device remotely accesses credential information based on the exchanged identifiers, and using the credential information, the electronic devices establish a secure connection via the selected channel using the second communication protocol. The electronic device determines a distance to the second electronic device using wireless ranging via the secure connection. When the electronic devices are proximate to each other, the electronic device can be unlocked.

20 Claims, 4 Drawing Sheets

(56) References Cited

U.S. PATENT DOCUMENTS

| | | | | |
|---|---|---|---|---|
| 2011/0305337 | A1* | 12/2011 | Devol | G06F 21/305 |
| | | | | 380/259 |
| 2012/0151210 | A1* | 6/2012 | Perez | G06F 21/35 |
| | | | | 713/168 |
| 2014/0225713 | A1* | 8/2014 | McIntyre | G07C 9/00309 |
| | | | | 340/5.61 |
| 2015/0058942 | A1* | 2/2015 | Dermu | G06F 21/445 |
| | | | | 726/6 |
| 2015/0161377 | A1* | 6/2015 | Rodzevski | G06F 21/35 |
| | | | | 726/18 |
| 2016/0294817 | A1* | 10/2016 | Tan | H04L 63/0838 |
| 2016/0295349 | A1* | 10/2016 | George | H04W 4/008 |
| 2017/0109770 | A1* | 4/2017 | Kusens | G06Q 30/0209 |
| 2017/0124362 | A1* | 5/2017 | Sheng | G06K 7/10297 |
| 2017/0154484 | A1* | 6/2017 | Pluss | G07C 9/00309 |
| 2017/0222982 | A1* | 8/2017 | Gosain | H04L 63/04 |
| 2017/0289800 | A1* | 10/2017 | Frusina | H04W 12/06 |
| 2017/0301166 | A1* | 10/2017 | Earles | G07C 9/00309 |
| 2017/0359689 | A1* | 12/2017 | Chhabra | H04W 4/023 |

* cited by examiner

WIRELESS LOGIN WITH SECURE PROXIMITY DETECTION

CROSS-REFERENCE TO RELATED APPLICATIONS

This application claims the benefit of U.S. Provisional Patent Application No. 62/348,711, entitled "WIRELESS LOGIN WITH SECURE PROXIMITY DETECTION" filed Jun. 10, 2016, the content of which is incorporated herein by reference in its entirety for all purposes.

FIELD

The described embodiments relate, generally, to wireless communications among electronic devices, including electronic devices and access points, and techniques for wireless access authentication with an electronic device using wireless communication and secure proximity detection based on wireless ranging.

BACKGROUND

While a variety of authentication techniques are available, users often perform access authentication with many electronic devices (such as legacy devices) using a so-called login technique. In particular, in response to a login prompt, a user may enter their login credentials, such as their username and password. If the username and password are valid, the user is allowed to access the electronic device.

However, this approach to access authentication is often time-consuming and cumbersome. In addition, the login credentials are often insecure. For example, users often manually enter their credentials and they often choose simple or obvious passwords that are easily cracked.

SUMMARY

Some embodiments relate to an electronic device that facilitates wireless access authentication. In particular, during operation, when the electronic device detects an access-intent operation, the electronic device may establish a connection with a second electronic device using a communication protocol. The electronic device may receive, from the second electronic device, a second identifier of the second electronic device and information specifying a preferred channel of the second electronic device when using a second communication protocol. Moreover, the electronic device may select a channel based at least in part on the preferred channel of the second electronic device and, in some embodiments, based at least in part on communication contexts of the electronic device and the second electronic device. The electronic device may transmit to the second electronic device an identifier of the electronic device and information specifying the selected channel. The electronic device may access, from a remote computer via a network (such as the Internet), credential information associated with a user of the electronic device and the second electronic device based at least in part on the identifier and the second identifier. Furthermore, the electronic device may establish, based at least in part on the credential information, a secure connection with the second electronic device using the selected channel and the second communication protocol. Additionally, the electronic device may determine a distance to the second electronic device using wireless ranging via the secure connection, and the electronic device may be unlocked or access to the electronic device may be enabled based at least in part on the determined distance.

In some embodiments, after detecting the access-intent operation, the electronic device performs a wireless scan for the second electronic device using the communication protocol, and the electronic device discovers the second electronic device.

The electronic device may detect the access-intent operation by detecting an opening of a lid of the electronic device or detecting input to a human-interface device associated with the electronic device (such as a mouse or a keypad). Moreover, the identifier may include a media access control (MAC) address of the electronic device, and the second identifier may include a second MAC address of the second electronic device.

Furthermore, the communication contexts may include information indicating whether the electronic device has a connection to the network via an access point, and information indicating whether the second electronic device has a second connection to the network via the same access point or via an intermediate device. When the second electronic device has the second connection, the electronic device may select the preferred channel as the channel.

The communication technique may be compatible with a Bluetooth Classic or Bluetooth Low Energy (BTLE) communication protocol, and the second communication technique may be compatible with an Institute of Electrical and Electronics Engineers (IEEE) 802.11 standardized communication protocol.

Other embodiments include operation with or by the second electronic device. For example, during operation the second electronic device may transmit advertisements using the communication protocol. The second electronic device may establish a connection with the electronic device using the communication protocol, and the second electronic device may transmit, to the electronic device, the second identifier of the second electronic device and information specifying the preferred channel of the second electronic device when using the second communication protocol. The second electronic device may receive the identifier of the electronic device and information specifying the selected channel. Next, the second electronic device may access, from a remote computer via the network (such as the Internet), credential information associated with the user of the electronic device and the second electronic device based at least in part on the identifier and the second identifier. Furthermore, the second electronic device may establish, based on the credential information, the secure connection with the electronic device using the selected channel and the second communication protocol.

Additionally, the second electronic device may determine the distance to the electronic device using wireless ranging via the secure connection, and the second electronic device may transmit information that specifies the distance to the electronic device.

Other embodiments provide an interface circuit in the electronic device or the second electronic device.

Other embodiments provide a computer-program product for use with the interface circuit in the electronic device and/or the second electronic device. This computer-program product includes instructions for at least some of the aforementioned operations performed by the interface circuit in the electronic device and/or the second electronic device.

Other embodiments provide a method for facilitating wireless access authentication. The method includes at least some of the aforementioned operations performed by the interface circuit in the electronic device and/or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Table 1 presents an example of communication-context information for two of the electronic devices of FIG. 1.

Table 2 presents an example of communication-context information for two of the electronic devices of FIG. 1.

Note that like reference numerals refer to corresponding parts throughout the drawings. Moreover, multiple instances of the same part are designated by a common prefix separated from an instance number by a dash.

DETAILED DESCRIPTION

When an electronic device (such as a laptop computer) detects an access-intent operation (such as detecting an opening of a lid of the electronic device, detecting touch via a keyboard, detecting movement of a mouse, etc.), the electronic device may establish a connection with a second electronic device (such as a smart-watch or a cellular telephone) using a communication protocol (such as BTLE). Using BTLE, the electronic devices may exchange identifiers (such as MAC addresses of the electronic devices), and the second electronic device may provide a preferred channel to use with a second communication protocol (such as Wi-Fi). Based at least in part on the preferred channel of the second electronic device and, in some embodiments, based at least in part on communication contexts of the electronic devices (such as information indicating whether either or both are connected to a network, such as the Internet, via one or more access points), the electronic device may select and transmit information specifying the selected channel. The electronic devices may remotely access credential information based on the exchanged identifiers. Using the credential information, the electronic devices may establish a secure Wi-Fi connection via the selected channel. In some embodiments, the electronic device may determine a distance to the other electronic device using wireless ranging via a secure connection. If the electronic devices are proximate to each other, the electronic device may be unlocked.

By facilitating wireless access authentication, this communication technique may allow a user to rapidly access the electronic device without the user entering or directly providing a password (and/or, more generally, login credentials). In addition, the secure connection in the communication technique can prevent spoofing and may protect the user's login credentials (such as the password). Consequently, the communication technique may improve the user experience when using the electronic device or the other electronic device, and thus may increase customer satisfaction and retention.

Note that the communication technique may be used during wireless communication between electronic devices in accordance with a communication protocol, such as: an IEEE 802.11 standard (which is sometimes referred to as Wi-Fi). For example, the communication technique may be used with IEEE 802.11ax. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a wireless local area network (WLAN), near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n;

IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). Note that the access point may include a soft access point, in which software executing on an electronic device (such as a computer or a cellular telephone) allows the electronic device to support Wi-Fi links with a small number of associated electronic devices (i.e., a soft access point may be a 'hotspot' for the small number of associated electronic devices).

Additionally, it should be understood that the electronic devices described herein may be configured as multi-mode wireless communication devices that are also capable of communicating via different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Figure 1:
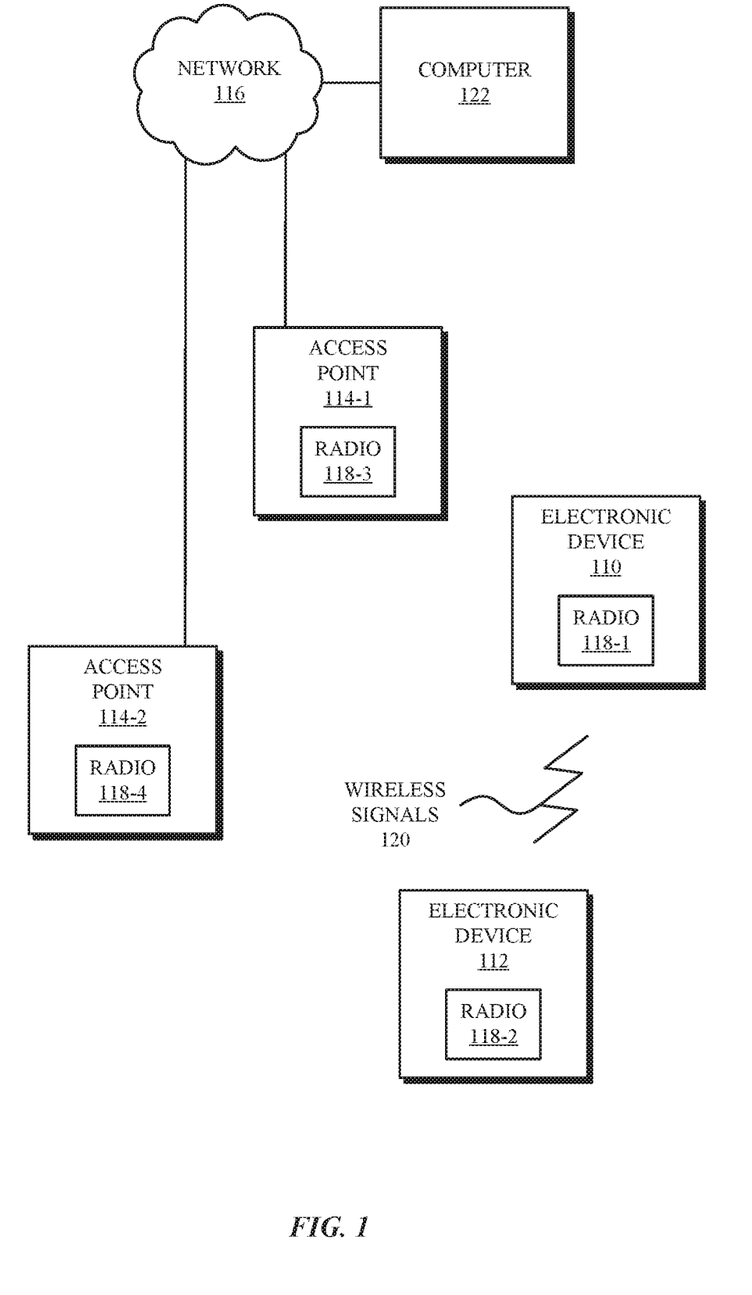
FIG. 1 is a block diagram illustrating an example of electronic devices communicating wirelessly.

We now describe the communication technique. FIG. 1 presents a block diagram illustrating an example of electronic devices communicating wirelessly. In particular, electronic device 110 (such as a smart-watch or a smart-phone) and electronic device 112 (such as a laptop computer, a notebook computer, a tablet, or another such electronic device) may communicate wirelessly using Bluetooth (such as BTLE) and/or in a WLAN using an IEEE 802.11 communication protocol (such as Wi-Fi and/or Wi-Fi direct). Moreover, electronic devices 110 and/or 112 may be associated with either of access points 114. For example, electronic devices 110 and 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access points 114 may provide access to a network 116, such as the Internet, via an Ethernet protocol, and may be a physical access point or a virtual or 'software' access point that is implemented on a computer or an electronic device.

As described further below with reference to FIG. 4, electronic devices 110 and 112 may include subsystems, such as a networking subsystem, a memory subsystem, and a processor subsystem. In addition, electronic devices 110 and 112 may include radios 118 in the networking subsystems. More generally, electronic devices 110 and 112 can include (or can be included within) any electronic devices with networking subsystems that enable electronic devices 110 and 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 120 (represented by a jagged line) are communicated by radios 118-1 and 118-2 in electronic devices 110 and 112, respectively. For example, as noted previously, electronic devices 110 and 112 may exchange packets using BTLE and/or a Wi-Fi communication protocol. In particular, electronic device 112 may initially be locked. Then, electronic device 112 may detect an access-intent operation. For example, a user may open a lid of electronic device 112 or the user may activate a human-interface device in or associated with electronic device 112 (such as when the user touches a physical or a virtual keyboard, moves a mouse, etc.). In response, electronic device 112 may perform a wireless scan for other electronic devices in proximity or nearby (i.e., within wireless-communication range) using BTLE.

Next, electronic device 112 may discover electronic device 110 by detecting one or more BTLE advertising frames broadcast by electronic device 110. In response, electronic device 112 may establish a connection with electronic device 110 using BTLE.

Moreover, electronic device 110 may transmit (and electronic device 112 may receive) an identifier of electronic device 110 (such as a MAC address of electronic device 110) and information specifying a preferred channel of electronic device 110 when using a Wi-Fi communication protocol. As described further below, electronic device 112 may select a channel based at least on the preferred channel and communication contexts of electronic devices 110 and 112 (such as whether or not electronic devices 110 and/or 112 have a connection to network 116 via the same or different access points 114 or an intermediate device, the channel(s) that they are using, etc.). In general, if electronic device 110 has an active connection, electronic device 112 may select the preferred channel as the channel to avoid disrupting any process(es) or application(s) executing on electronic device 110 during the wireless ranging described below. Furthermore, electronic device 112 may transmit an identifier of electronic device 112 (such as a MAC address of electronic device 112) and information specifying the selected channel.

Then, electronic devices 110 and 112 may access, on a remote computer (or server) 122 via one or more access points 114 and network 116, credential information associated with a user of electronic devices 110 and 112 based on the identifiers. For example, the electronic devices 110 and 112 may access a user account that specifies electronic devices 110 and 112 and the associated credential information. Note that the user account may be associated with a provider of electronic devices 110 and 112. Moreover, the credential information may include encryption keys, a secure hashing function (such as a one-way hashing function), etc., that can be used to establish a secure connection between electronic devices 110 and 112 and/or to encrypt one or more fields in frames that are communicated between electronic devices 110 and 112. In some embodiments, the credential information includes login credentials or login information for electronic device 112, such as a username and password.

Based on the credential information, electronic devices 110 and 112 may set up a secure connection using the selected channel and the Wi-Fi communication protocol (such as Wi-Fi direct). Additionally, electronic device 112 may determine a distance to electronic device 110 using wireless ranging via the secure connection. (Alternatively or additionally, electronic device 110 may determine the distance to electronic device 112 using wireless ranging (or radio-based distance measurements) via the secure connection, and the determined distance may be transmitted to electronic device 112.) Based on the determined distance, electronic device 112 may be unlocked or access to electronic device 112 may be enabled. For example, if the distance is less than a threshold value (such as 0-3 m), electronic device 112 may be unlocked. In this way, electronic device 112 may not be inadvertently unlocked when electronic device 110 is in BTLE wireless-communication range but the user is on the other side of a room, etc.

During wireless ranging, note that an electronic device (such as electronic device 112) may transmit a frame or a packet that includes a transmission time. When this frame or packet is received by another electronic device (such as electronic device 110), the arrival time may be determined. Based on the product of the time of flight (the difference of the arrival time and the transmission time) and the speed of propagation, the distance between electronic devices 110 and 112 can be calculated. This distance may be communicated in a subsequent transmission of a frame or a packet from electronic device 110 to electronic device 112. Alternatively, electronic device 110 may transmit a frame or a packet that includes a transmission time, and electronic device 112 may determine the distance between electronic devices 110 and 112 based on the product of the time of flight (the difference of an arrival time and the transmission time) and the speed of propagation. Note that this approach for dynamically determining distances between electronic devices that wirelessly communicate is sometimes referred to as 'wireless ranging.' Similarly, a variation on this approach in which electronic device 112 (or 110) transmits frames or packets that are reflected at electronic device 110 (or 112) may optionally be used to dynamically determine the distance between electronic devices 110 and 112. Thus, wireless ranging may be used by electronic devices 110 and/or 112 to determine when another electronic device is proximate in an environment.

While the preceding example illustrated wireless ranging with synchronized clocks in electronic devices 110 and 112, in other embodiments the clocks are not synchronized. For example, the position of electronic device 110 or 112 may be estimated based on the speed of propagation and the time of arrival data of wireless signals 120 at several receivers at different known locations (which is sometimes referred to as 'differential time of arrival') even when the transmission time is unknown or unavailable. More generally, a variety of radiolocation techniques may be used, such as: determining distance based on a difference in the power of the received signal strength indicator (RSSI) relative to the original transmitted signal strength (which may include corrections for absorption, refraction, shadowing and/or reflection); determining the angle of arrival at a receiver (including non-line-of-sight reception) using a directional antenna or based on the differential time of arrival at an array of antennas with known location(s); determining the distance based on backscattered wireless signals; and/or determining the angle of arrival at two receivers having known location (i.e., trilateration or multilateration). Note that wireless signals 120 may include transmissions over GHz or multi-GHz bandwidths to create pulses of short duration (such as, e.g., approximately 1 ns), which may allow the distance to be determined within 0.3 m (e.g., 1 ft). In some embodiments, the wireless ranging is facilitated using location information, such as a location of one or more of electronic devices in FIG. 1 that are determined or specified by a local positioning system, a Global Positioning System and/or a wireless network.

In these ways, the communication technique may allow electronic device 110 to be used to facilitate rapid access to 112 by performing wireless access authentication. This capability may improve the user experience when using electronic devices 110 and/or 112.

In the described embodiments, processing a packet or frame in one of electronic devices 110 and 112 includes: receiving wireless signals 120 encoding a packet or a frame; decoding/extracting the packet or frame from received wireless signals 120 to acquire the packet or frame; and processing the packet or frame to determine information contained in the packet or frame (such as data in the payload).

In general, the communication in the communication technique may be characterized by a variety of communication-performance metrics. For example, the communication-performance metric may include: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated maximum data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
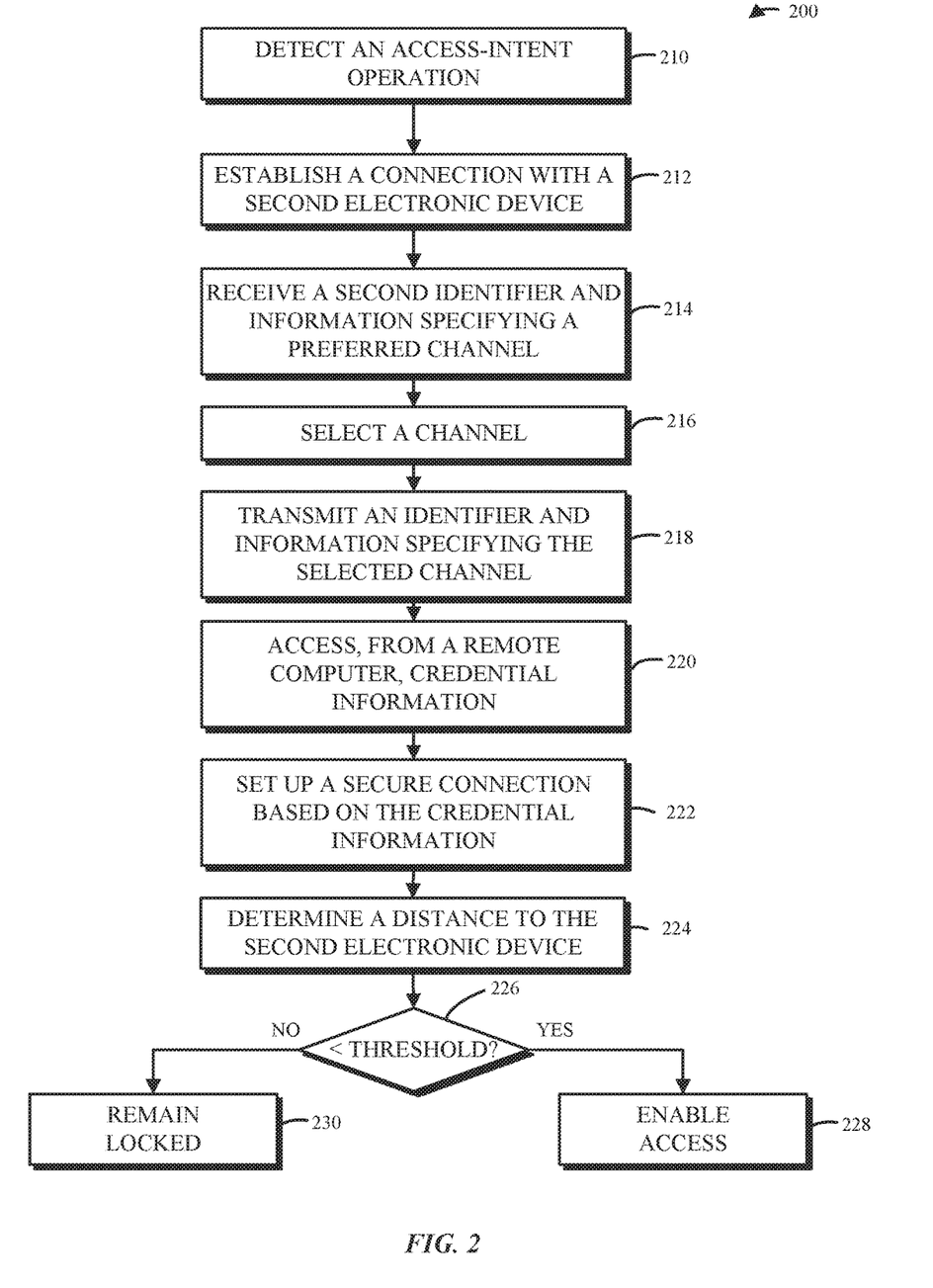
FIG. 2 is a flow diagram illustrating an example of a method for facilitating wireless access authentication using one of the electronic devices in FIG. 1.

FIG. 2 presents a flow diagram illustrating an example method 200 for facilitating wireless access authentication in accordance with some embodiments. This method may be performed by an electronic device, such as an interface circuit in electronic device 110 in FIG. 1. During operation, the electronic device may detect an access-intent operation (operation 210), e.g., opening a device lid/cover or contacting an interface device, such as a keyboard, mouse, or touch-input. Then, the electronic device may establish a connection with a second electronic device (operation 212) using a communication protocol. For example, after detecting the access-intent operation (operation 210), the electronic device may perform a wireless scan for the second electronic device using the communication protocol, and the electronic device may discover the second electronic device.

Moreover, the electronic device may receive, from the second electronic device, a second identifier of the second electronic device and information specifying a preferred channel (operation 214) of the second electronic device when using a second communication protocol.

Furthermore, the electronic device may select a channel (operation 216) based at least on the preferred channel and communication contexts of the electronic device and the second electronic device, and the electronic device may transmit an identifier of the electronic device and information specifying the selected channel (operation 218). Note that the communication contexts may include whether the electronic device has a connection to the network via an access point, and whether the second electronic device has a second connection to the network via the same or a different access point or an intermediate device. When the second electronic device has the second connection, the electronic device may select the preferred channel as the channel.

Next, the electronic device may access, on a remote computer via a network, credential information (operation 220) associated with a user of the electronic device and the second electronic device based on the identifier and the second identifier.

Additionally, the electronic device may set up, based on the credential information, a secure connection (operation 222) with the second electronic device using the selected channel and the second communication protocol.

Subsequently, the electronic device may determine a distance to the second electronic device (operation 224) using wireless ranging via the secure connection, and the electronic device may be unlocked or access to the electronic device may be enabled (operation 228) based on the determined distance. For example, if the distance is less than a threshold value (operation 226), the electronic device may be unlocked or access to the electronic device may be enabled (operation 228). Otherwise (operation 226), the electronic device may remain locked (operation 230).

Note that in some embodiments of methods 200, there may be additional or fewer operations. Moreover, the order of the operations may be changed, and/or two or more operations may be combined into a single operation.

In some embodiments, at least some of the operations in method are performed by interface circuits in the electronic device and the second electronic device. For example, at least some of the operations may be performed by firmware executed by an interface circuit, such as firmware associated with a MAC layer, as well as one or more circuits in a physical layer in the interface circuit.

Figure 3:
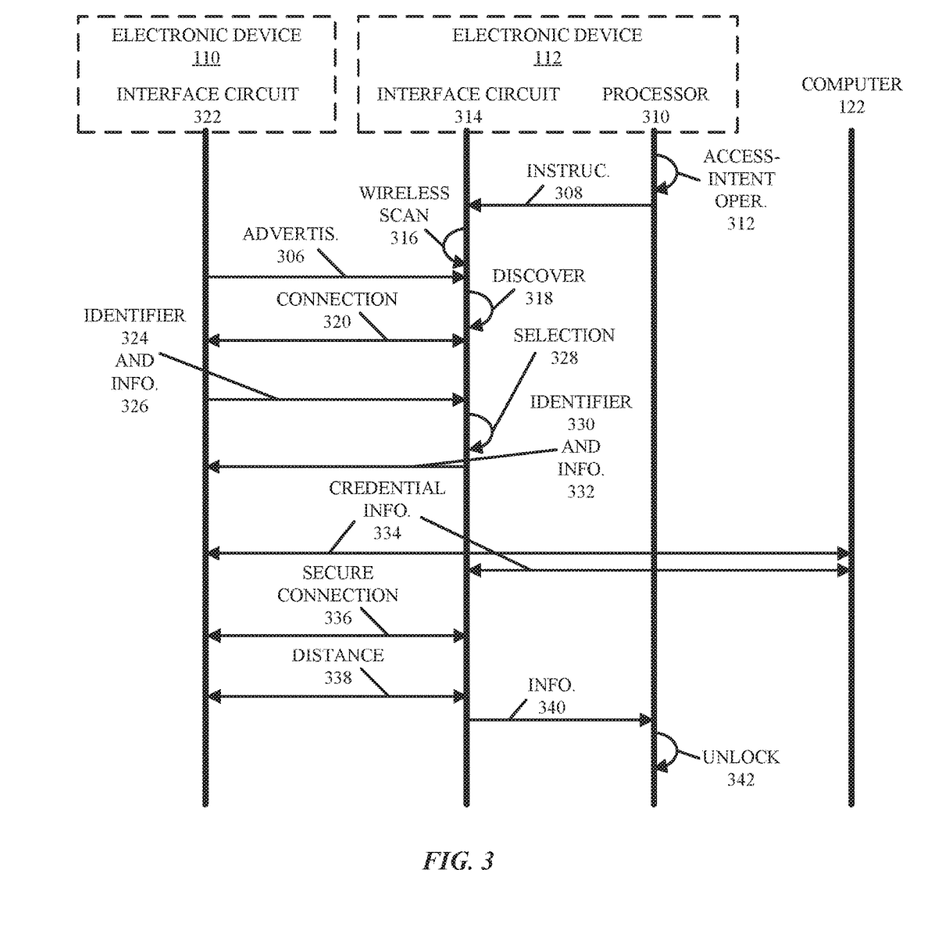
FIG. 3 is a flow diagram illustrating an example of communication between electronic devices, such as the electronic devices of FIG. 1.

The communication techniques are further illustrated in FIG. 3, which presents a flow diagram illustrating an example of communication between electronic device 110, electronic device 112, access point 114-1 and computer 122. In particular, processor 310 in electronic device 112 may detect an access-intent operation 312. After detecting access-intent operation 312, interface circuit 314 may perform a wireless scan 316 for electronic device 110 using the communication protocol based on instruction 308, and interface circuit 314 may discover 318 electronic device 110 based on advertisement 306 transmitted by interface circuit 322 in electronic device 110. Then, interface circuit 314 may establish a connection 320 with interface circuit 322 using the communication protocol.

Moreover, interface circuit 322 may transmit an identifier 324 of electronic device 110 and information 326 specifying a preferred channel of electronic device 110 when using the second communication protocol, and identifier 324 and information 326 may be received by interface circuit 314.

Furthermore, processor 310 (or interface circuit 314) may select a channel 328 based at least on the preferred channel and communication contexts of electronic devices 110 and 112, and interface circuit 314 may transmit an identifier 330 of electronic device 112 and information 332 specifying the selected channel 328. The identifier 330 and information 332 may be received by interface circuit 322.

Next, interface circuits 314 and 322 may access, on computer 122, credential information 334 associated with a user of electronic devices 110 and 112 based on identifiers 324 and 330.

Based on credential information 334, interface circuits 314 and 322 may set up a secure connection 336 with each other using the selected channel 328 and the second communication protocol.

Subsequently, interface circuit 314 and/or 322 may determine a distance 338 between electronic devices 110 and 112 using wireless ranging via secure connection 336, and processor 310 may unlock 342 electronic device 112 based on login credentials (which may be included in credential information 334) and/or the determined distance 338, and, more generally, information 340 provided by interface circuit 314.

Representative Embodiments

We now describe embodiments of the communication technique. Wireless access authentication poses several challenges. Notably, user login needs to be fast (otherwise, a user may not be willing to wait) and secure to prevent spoofing or unauthorized access. However, it can be difficult to quickly set up a secure connection, which may be frustrating to users.

In the communication technique, BTLE is used to bootstrap secure Wi-Fi communication, which then performs the wireless access authentication. The total latency of the wireless access may be less than 1 or 2 s. This capability may allow wireless access authentication to a wide variety of electronic devices, including legacy electronic devices that do not include a touch identifier (such as a fingerprint sensor). Consequently, the communication technique may eliminate the need for a user to manually provide their password or login credentials, and may provide rapid and secure access to the user's electronic device(s).

During the communication technique, a user may bring a smart-watch (which is sometimes referred to as a 'key') that is advertising using BTLE frames in a band of frequencies (such as the 2.4 GHz band of frequencies) proximate to their laptop computer. Initially, the laptop computer may locked (e.g., displaying a locked screen). When the user lifts the lid of the laptop, touches a keyboard, moves a mouse and, more generally, provides an access-intent operation, the laptop computer may perform a wireless scan. When the laptop computer detects a BTLE frame with an advertisement for the smart-watch, the laptop computer may discover the smart-watch. Then, the laptop computer may establish a BTLE connection with the smart-watch. Note that the BTLE connection may or may not be a secure connection.

After the BTLE connection is established, the smart-watch may send its MAC address to the smart watch along with information specifying a channel that the smart-watch would prefer to use for IEEE 802.11-compatible communication. Note that the laptop computer may be capable of communicating in one or more bands of frequencies (such as the 2.4 GHz band of frequencies and the 5 GHz band of frequencies).

Next, the laptop computer may determine or select which channel to use. This determination may be based on the preferred channel of the smart-watch and the communication contexts or states of the smart-watch and the laptop computer. In particular, the communication contexts may include whether the smart-watch and/or the laptop computer have access to the Internet via one or more access points (and/or intermediate devices, such as the user's cellular telephone), e.g., the infrastructure connectivity of the smart-watch and/or the laptop computer. Because the smart-watch may be more restricted in the band of frequencies it can use for communication, and in order to avoid disrupting a data stream associated with an application executing on the smart-watch by forcing the smart-watch to switch or hop between channels, the preferred channel may be given priority in the determination if the smart-watch has a connection to the Internet via an access point and/or an intermediate device. This is illustrated in Table 1, which presents an example of communication-context information for the smart-watch and the laptop computer. In particular, if the smart-watch is disconnected from the Internet and the laptop computer is also disconnected, the laptop computer may perform a scan of a limited set of channels (such as channels 1, 6 and 11, which may be common across multiple countries or regulatory regions) and may choose one of these channels as the channel (such as the least congested channel in the limited set). Alternatively, if the smart-watch is (directly or indirectly) connected to an access point, the laptop computer may select the preferred channel of the smart-watch whether or not the laptop computer is connected to the same or a different access point. Furthermore, if the smart-watch is disconnected and the laptop is connected using a channel in the 2.4 GHz band of frequencies, this channel may be selected as the channel during the determination. However, if the smart-watch is disconnected and the laptop is connected using a channel in the 5 GHz band of frequencies, the laptop computer may perform a scan of the limited set of channels (such as channels 1, 6 and 11) and may choose one of these channels as the channel (because the smart-watch may not be able to operate in the 5 GHz band of frequencies).

TABLE 1

| Smart-phone Infrastructure Connection Status and Frequency Band | Laptop Infrastructure Connection Status and Frequency Band | Determined Channel or Action |
| --- | --- | --- |
| Disconnected | Disconnected | Scan 1, 6 and 11 |
| Connected, 2.4 GHz | Disconnected | Use current smart-watch channel |
| Connected, 2.4 GHz | Connected, 2.4 or 5 GHz | Use current smart-watch channel |
| Disconnected | Connected, 2.4 GHz | Use current laptop channel |
| Disconnected | Connected, 5 GHz | Scan 1, 6 and 11 |

Next, the laptop computer may transmit its MAC address to the smart-watch via the BTLE connection along with the selected channel. Moreover, the smart-watch and the laptop computer may, respectively, access a cloud-based account of the user with credential information for the smart-watch and the laptop computer. For example, the smart-watch may perform a look up in the cloud-based account based on the MAC address for the laptop computer to obtain a public encryption key or secure hashing table for the laptop computer. In some embodiments, the smart-watch may also obtain login credentials (such as a username and password) for the laptop computer. Similarly, the laptop computer may perform a look up in the cloud-based account based on the MAC address for the smart-watch to obtain a public encryption key or secure hashing table for the smart-watch.

Using the credentials, the smart-watch and the laptop computer may establish a secure connection using the Wi-Fi communication protocol and the selected channel. For example, the secure connection may use Wi-Fi direct, such as AWDL. Note that the information exchanged using BTLE may speed up the establishment of the secure connection between the smart-watch and the laptop computer, thereby reducing the latency of the wireless access authentication.

Furthermore, using the secure connection, the laptop computer and/or the smart-watch may determine the distance between the smart-watch and the laptop computer via wireless ranging. If the distance is less than a threshold value (such as, e.g., 0-3 m), the laptop computer may be unlocked. Otherwise, the laptop computer may remain locked. In this way, the user can avoid inadvertently unlocking the laptop computer when they are within BTLE communication range.

Note that the secure connection may be temporary. For example, it may have a duration of 1 s, so that there is sufficient time to determine the distance using wireless ranging and to either unlock the laptop computer or not.

In the previous discussion, the user needs to be signed into the smart-watch and the smart-watch needs to be active in order to perform the wireless access authentication. However, in some embodiments, the wireless access authentication is performed in the smart-watch was unlocked and was recently locked (such as within the last 20 s). This may provide additional security by preventing unlocking of the laptop computer by merely bringing a locked smart-watch into proximity.

In some embodiments, another electronic device is used as the key. For example, the user may use their smart-phone, or tablet computer, notebook computer, wearable, or other computing such device. In particular, the user may have unlocked and been using their cellular telephone to check their email, when they walk up to their laptop computer and put their (now locked) cellular telephone in their pocket. In this scenario, the user may still be able to unlock the laptop using the communication technique within a brief time interval (such as 20 s). Furthermore, in some embodiments, the 'key' may be used to unlock a computing device other than a laptop, such as a smart-phone, a media device, a notebook computer, a tablet computer, a wearable, a home automation device, or other such computing device.

Note that when another electronic device is used as the key, additional bands of frequencies may be available. For example, the user's cellular telephone or tablet computer may be able to communicate in the 2.4 GHz band of frequencies and the 5 GHz band of frequencies. In these embodiments, the determination of the channel to be used in the secure channel may be modified. This is shown in Table 2, which presents an example of communication-context information for the cellular telephone and the laptop computer. In particular, if the cellular telephone is disconnected from the Internet and the laptop computer is also disconnected, the laptop computer may perform a scan of a limited set of channels (such as channels 1, 6, 11, 44 and 149, which may be common across multiple countries or regulatory regions) and may choose one of these channels as the channel (such as the least congested channel in the limited set). Alternatively, if the cellular telephone is connected to the Internet, the laptop computer may select the preferred channel of the cellular telephone when the laptop computer is connected or disconnected from the Internet. Furthermore, if the cellular telephone is disconnected from the Internet and the laptop is connected using a channel in the 2.4 GHz band of frequencies, this channel may be selected as the channel during the determination. Additionally, if the cellular telephone is disconnected from the Internet and the laptop is connected using a channel in the 5 GHz band of frequencies, this channel may be selected as the channel during the determination.

TABLE 2

| Cellular Telephone Infrastructure Connection Status and Frequency Band | Laptop Infrastructure Connection Status and Frequency Band | Determined Channel or Action |
|---|---|---|
| Disconnected | Disconnected | Scan 1, 6, 11, 44 and 149 |
| Connected, 2.4 GHz | Disconnected | Use current cellular-telephone channel |
| Connected, 2.4 GHz | Connected, 2.4 or 5 GHz | Use current cellular-telephone channel |
| Disconnected | Connected, 2.4 GHz | Use current laptop channel |
| Disconnected | Connected, 5 GHz | Use current laptop channel |

As noted previously, by avoiding (when possible) channel switching or hoping by the cellular telephone, a data stream associated with an application executing on the cellular telephone may not be disrupted. For example, a video phone call can be handed off seamlessly to the laptop computer without a dropped call or increased latency.

In some embodiments, the communication technique is used to perform wireless access authentication for another electronic device, such as a tablet computer, a television, etc.

We now describe embodiments of an electronic device. FIG. 4 presents a block diagram of an electronic device 400 (which may be an access point, another electronic device, such as a station, a laptop computer, a smart-phone, a tablet, a smart-watch, etc.) in accordance with some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), a read-only memory (ROM), flash memory, and/or other types of memory. In some embodiments, instructions for processing subsystem 410 in memory subsystem 412 include: one or more program modules or sets of instructions (such as program module 422 or operating system 424), which may be executed by processing subsystem 410. For example, a ROM can store programs, utilities or processes to be executed in a non-volatile manner, and DRAM can provide volatile data storage, and may store instructions related to the operation of electronic device 400. Note that the one or more computer programs may constitute a computer-program mechanism, a computer-readable storage medium or software. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410. In some embodiments, the one or more computer programs are distributed over a network-coupled computer system so that the one or more computer programs are stored and executed in a distributed manner.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Figure 4:
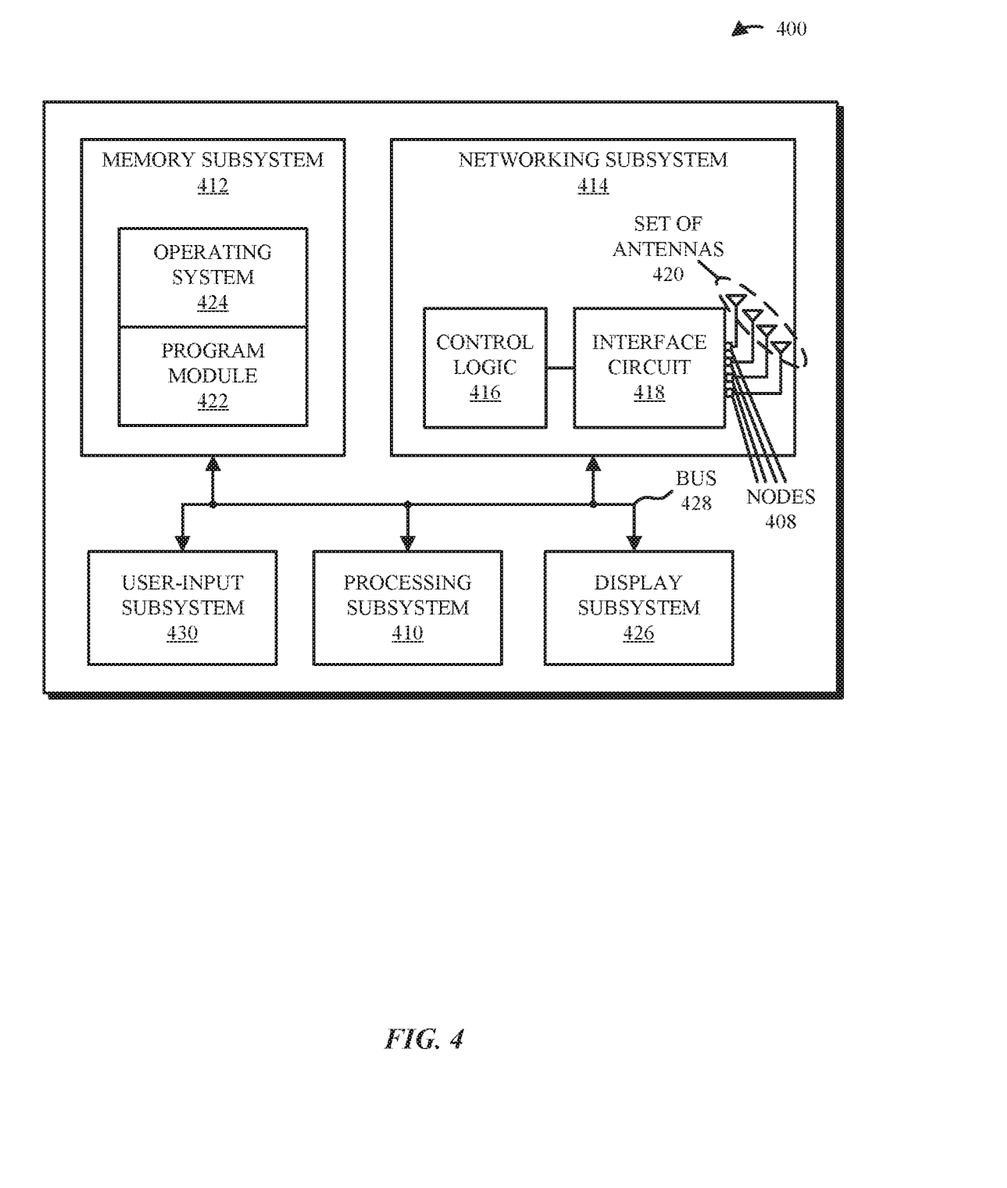
FIG. 4 is a block diagram illustrating an example of one of the electronic devices of FIG. 1.

Networking subsystem 414 includes one or more devices configured to couple to and communicate on a wired and/or wireless network (i.e., to perform network operations), including: control logic 416, an interface circuit 418 and a set of antennas 420 (or antenna elements) in an adaptive array that can be selectively turned on and/or off by control logic 416 to create a variety of optional antenna patterns or 'beam patterns.' (While FIG. 4 includes set of antennas 420, in some embodiments electronic device 400 includes one or more nodes, such as nodes 408, e.g., a pad, which can be coupled to set of antennas 420. Thus, electronic device 400 may or may not include set of antennas 420.) For example, networking subsystem 414 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices.

Within electronic device 400, processing subsystem 410, memory subsystem 412, and networking subsystem 414 are coupled together using bus 428 that facilitates data transfer between these components. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc. Display subsystem 426 may be controlled by processing subsystem 410 to display information to a user (e.g., information relating to incoming, outgoing, or an active communication session).

Electronic device 400 can also include a user-input subsystem 430 that allows a user of the electronic device 400 to interact with electronic device 400. For example, user-input subsystem 430 can take a variety of forms, such as: a button, keypad, dial, touch screen, audio input interface, visual/image capture input interface, input in the form of sensor data, etc.

Electronic device 400 can be (or can be included in) any electronic device with at least one network interface. For example, electronic device 400 may include: a cellular telephone or a smart-phone, a tablet computer, a laptop computer, a notebook computer, a personal or desktop computer, a netbook computer, a media player device, an electronic book device, a MiFi® device, a smart-watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program module 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414. This integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used BTLE and a Wi-Fi direct communication protocol as illustrative examples, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 422, operating system 424 (such as a driver for interface circuit 418) or in firmware in interface circuit 418. Alternatively or additionally, at least some of the operations in the communication technique may be implemented in a physical layer, such as hardware in interface circuit 418. In some embodiments, the communication technique is implemented, at least in part, in a MAC layer and/or in a physical layer in interface circuit 418.

In some embodiments, an electronic device includes: one or more nodes configured to communicatively couple to an antenna; and an interface circuit, communicatively coupled to the one or more nodes, configured to communicate with a second electronic device, and configured to cause the electronic device to: (i) detect an access-intent operation; (ii) establish, based at least in part on the access-intent operation, a connection with the second electronic device using a communication protocol; (iii) receive, from the second electronic device, a second identifier of the second electronic device and information specifying a preferred channel of the second electronic device when using a second communication protocol; (iv) select a channel based at least in part on the preferred channel of the second electronic device and based at least in part on communication contexts of the electronic device and the second electronic device; (v)

transmit, to the second electronic device, an identifier of the electronic device and information specifying the selected channel; (vi) access, from a remote computer via a network, credential information associated with a user of the electronic device and the second electronic device based on the identifier and the second identifier; (vii) establish, based at least in part on the credential information, a secure connection with the second electronic device using the selected channel and the second communication protocol; (viii) determine a distance to the second electronic device using wireless ranging via the secure connection; and (ix) enable access to the electronic device based at least in part on the determined distance.

In some embodiments, the interface circuit is further configured to cause the electronic device to: perform, based at least in part on the access-intent operation, a wireless scan for the second electronic device using the communication protocol; and discover the second electronic device. In some embodiments, the electronic device detects the access-intent operation by one or more of: opening a lid of the electronic device, or contacting a human-interface device associated with the electronic device. In some embodiments, the identifier includes a media access control (MAC) address of the electronic device, and the second identifier includes a second MAC address of the second electronic device. In some embodiments, the communication contexts include: information indicating whether the electronic device has a connection to the network via an access point, and information indicating whether the second electronic device has a second connection to the network via the same access point or via an intermediate device. In some embodiments, when the second electronic device has the second connection, the electronic device selects the preferred channel as the channel. In some embodiments, the communication protocol is compatible with a Bluetooth Low Energy (BTLE) communication protocol, and the second communication protocol is compatible with an IEEE 802.11 standardized communication protocol. In some embodiments, the electronic device includes one of: a laptop computer, a tablet computer, or a cellular telephone.

In some embodiments, a non-transitory computer-readable storage medium stores instructions that, when executed by an interface circuit included in a laptop computer, cause the laptop computer to facilitate wireless access authentication, by carrying out one or more operations that include: (i) detecting an access-intent operation; (ii) establishing, based at least in part on the access-intent operation, a connection with a second electronic device using a Bluetooth-compatible communication protocol; (iii) receiving, from the second electronic device, a second identifier of the second electronic device and information specifying a preferred channel of the second electronic device for use with a Wi-Fi-compatible communication protocol; (iv) selecting a channel based at least in part on the preferred channel of the second electronic device; (v) transmitting, to the second electronic device, an identifier of the laptop computer and information specifying the selected channel; (vi) accessing, from a remote computer via a network, credential information associated with a user of the laptop computer and the second electronic device based on the second identifier; (vii) establishing, based at least in part on the credential information, a secure connection with the second electronic device using the selected channel and the Wi-Fi-compatible communication protocol; (viii) determining a distance to the second electronic device using wireless ranging via the secure connection; and (ix) enabling access to the laptop computer based at least in part on the determined distance.

In some embodiments, the one or more operations further include: performing, based at least in part on the access-intent operation, a wireless scan for the second electronic device using the Bluetooth-compatible communication protocol; and discovering the second electronic device. In some embodiments, the laptop computer detects the access-intent operation by one or more of: detecting an opening of a lid of the laptop computer, or detecting input to a human-interface device associated with the laptop computer. In some embodiments, the identifier includes a media access control (MAC) address of the laptop computer, and the second identifier includes a second MAC address of the second electronic device. In some embodiments, the laptop computer selects the channel further based at least in part on communication contexts that include: information indicating whether the laptop computer has a connection to the network via an access point, and information indicating whether the second electronic device has a second connection to the network via the same access point or via an intermediate device. In some embodiments, when the second electronic device has the second connection, the laptop computer selects the preferred channel as the channel.

In some embodiments, a method for facilitating wireless access authentication includes using an interface circuit in an electronic device to perform actions that include: (i) detecting an access-intent operation; (ii) establishing, based at least in part on the access-intent operation, a connection with the second electronic device using a communication protocol; (iii) receiving, from the second electronic device, a second media access control (MAC) address of the second electronic device and information specifying a preferred channel of the second electronic device when using a second communication protocol; (iv) selecting a channel based at least on the preferred channel of the second electronic device and based at least in part on communication contexts of the electronic device and the second electronic device; (v) transmitting, to the second electronic device, a MAC address of the electronic device and information specifying the selected channel; (vi) accessing, from a remote computer via a network, credential information associated with a user of the electronic device and the second electronic device based at least in part on the MAC address and the second MAC address; (vii) establishing, based at least in part on the credential information, a secure connection with the second electronic device using the selected channel and the second communication protocol; (viii) determining a distance to the second electronic device using wireless ranging via the secure connection; and (ix) unlocking the electronic device based at least in part on the determined distance.

In some embodiments, the method further includes: performing, based at least in part on the access-intent operation, a wireless scan for the second electronic device using the communication protocol; and discovering the second electronic device. In some embodiments, detecting the access-intent operation includes one or more of: detecting an opening of a lid of the electronic device, or detecting an input to a human-interface device associated with the electronic device. In some embodiments, the communication contexts include: information indicating whether the electronic device has a connection to the network via an access point, and information indicating whether the second electronic device has a second connection to the network via the same access point or via an intermediate device. In some embodiments, when the second electronic device has the second connection, the electronic device selects the preferred channel as the channel. In some embodiments, the communication protocol is compatible with a Bluetooth Low Energy (BTLE) communication protocol, and the second communication protocol is compatible with an IEEE 802.11 standardized communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more nodes configured to communicatively couple to an antenna; and
   an interface circuit, communicatively coupled to the one or more nodes, configured to communicate with a second electronic device, and configured to cause the electronic device to:
   detect an access-intent operation;
   establish, based at least in part on the access-intent operation, a connection with the second electronic device using a communication protocol;
   receive, from the second electronic device, a second identifier of the second electronic device and information specifying a preferred channel of the second electronic device when using a second communication protocol;
   select a channel based at least in part on the preferred channel of the second electronic device and based at least in part on communication contexts of the electronic device and the second electronic device;
   transmit, to the second electronic device, an identifier of the electronic device and information specifying the selected channel;
   access, from a remote computer via a network, credential information associated with a user of the electronic device and the second electronic device based on the identifier and the second identifier;
   establish, based at least in part on the credential information, a secure connection with the second electronic device using the selected channel and the second communication protocol;
   determine a distance to the second electronic device using wireless ranging via the secure connection; and
   enable access to the electronic device based at least in part on the determined distance.

2. The electronic device of claim 1, wherein the interface circuit is further configured to cause the electronic device to:
   perform, based at least in part on the access-intent operation, a wireless scan for the second electronic device using the communication protocol; and
   discover the second electronic device.

3. The electronic device of claim 1, wherein the electronic device detects the access-intent operation by one or more of: detecting an opening of a lid of the electronic device, or detecting input to a human-interface device associated with the electronic device.

4. The electronic device of claim 1, wherein:
   the identifier includes a media access control (MAC) address of the electronic device, and
   the second identifier includes a second MAC address of the second electronic device.

5. The electronic device of claim 1, wherein the communication contexts include:
   information indicating whether the electronic device has a connection to the network via an access point, and
   information indicating whether the second electronic device has a second connection to the network via the access point or via an intermediate device.

6. The electronic device of claim 5, wherein, when the second electronic device has the second connection, the electronic device selects the preferred channel as the channel.

7. The electronic device of claim 1, wherein:
   the communication protocol is compatible with a wireless personal area network communication protocol, and
   the second communication protocol is compatible with a wireless local area network communication protocol.

8. The electronic device of claim 1, wherein the electronic device includes one of: a laptop computer, a tablet computer, or a cellular telephone.

9. A non-transitory computer-readable storage medium storing instructions that, when executed by an interface circuit included in a laptop computer, cause the laptop computer to facilitate wireless access authentication, by carrying out one or more operations that comprise:
   detecting an access-intent operation;
   establishing, based at least in part on the access-intent operation, a connection with a second electronic device using a wireless personal area network communication protocol;
   receiving, from the second electronic device, a second identifier of the second electronic device and information specifying a preferred channel of the second electronic device for use with a wireless local area network communication protocol;
   selecting a channel based at least in part on the preferred channel of the second electronic device;
   transmitting, to the second electronic device, an identifier of the laptop computer and information specifying the selected channel;
   accessing, from a remote computer via a network, credential information associated with a user of the laptop computer and the second electronic device based on the second identifier;
   establishing, based at least in part on the credential information, a secure connection with the second electronic device using the selected channel and the wireless local area network communication protocol;
   determining a distance to the second electronic device using wireless ranging via the secure connection; and
   enabling access to the laptop computer based at least in part on the determined distance.

10. The non-transitory computer-readable storage medium of claim 9, wherein the one or more operations further comprise:

performing, based at least in part on the access-intent operation, a wireless scan for the second electronic device using the wireless personal area network communication protocol; and discovering the second electronic device.

11. The non-transitory computer-readable storage medium of claim 9, wherein the laptop computer detects the access-intent operation by one or more of: detecting an opening of a lid of the laptop computer, or detecting input to a human-interface device associated with the laptop computer.

12. The non-transitory computer-readable storage medium of claim 9, wherein:

the identifier includes a media access control (MAC) address of the laptop computer, and the second identifier includes a second MAC address of the second electronic device.

13. The non-transitory computer-readable storage medium of claim 9, wherein the laptop computer selects the channel further based at least in part on communication contexts that include:

information indicating whether the laptop computer has a connection to the network via an access point, and information indicating whether the second electronic device has a second connection to the network via the access point or via an intermediate device.

14. The non-transitory computer-readable storage medium of claim 13, wherein, when the second electronic device has the second connection, the laptop computer selects the preferred channel as the channel.

15. A method for facilitating wireless access authentication, the method comprising:

using an interface circuit in an electronic device:

detecting an access-intent operation;

establishing, based on the access-intent operation, a connection with a second electronic device using a communication protocol;

receiving, from the second electronic device, a second media access control (MAC) address of the second electronic device and information specifying a preferred channel of the second electronic device when using a second communication protocol;

selecting a channel based at least in part on the preferred channel of the second electronic device and based at least in part on communication contexts of the electronic device and the second electronic device;

transmitting, to the second electronic device, a MAC address of the electronic device and information specifying the selected channel;

accessing, from a remote computer via a network, credential information associated with a user of the electronic device and the second electronic device based on the MAC address and the second MAC address;

establishing, based at least in part on the credential information, a secure connection with the second electronic device using the selected channel and the second communication protocol;

determining a distance to the second electronic device using wireless ranging via the secure connection; and unlocking the electronic device based at least in part on the determined distance.

16. The method of claim 15, wherein the method further comprises:

performing, based at least in part on the access-intent operation, a wireless scan for the second electronic device using the communication protocol; and discovering the second electronic device.

17. The method of claim 15, wherein detecting the access-intent operation includes one or more of: detecting an opening of a lid of the electronic device, or detecting input to a human-interface device associated with the electronic device.

18. The method of claim 15, wherein the communication contexts include:

information indicating whether the electronic device has a connection to the network via an access point, and information indicating whether the second electronic device has a second connection to the network via the access point or via an intermediate device.

19. The method of claim 18, wherein, when the second electronic device has the second connection, the electronic device selects the preferred channel as the channel.

20. The method of claim 15, wherein the communication protocol is compatible with a wireless personal area network communication protocol, and the second communication protocol is compatible with a wireless local area network communication protocol.

* * * * *